March 19, 1929. H. L. GENTRY 1,705,666
STOPPER
Filed Sept. 7, 1926
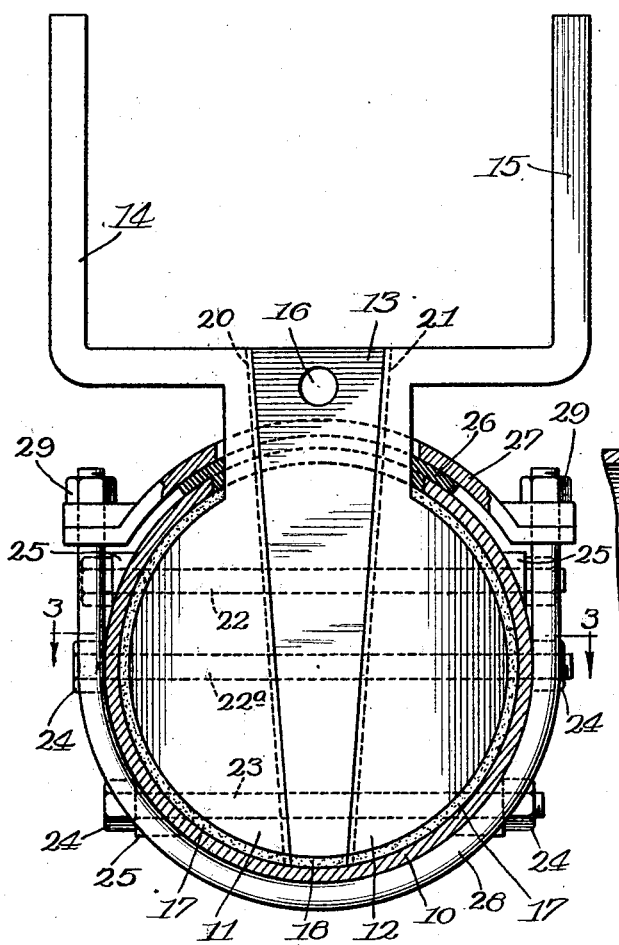
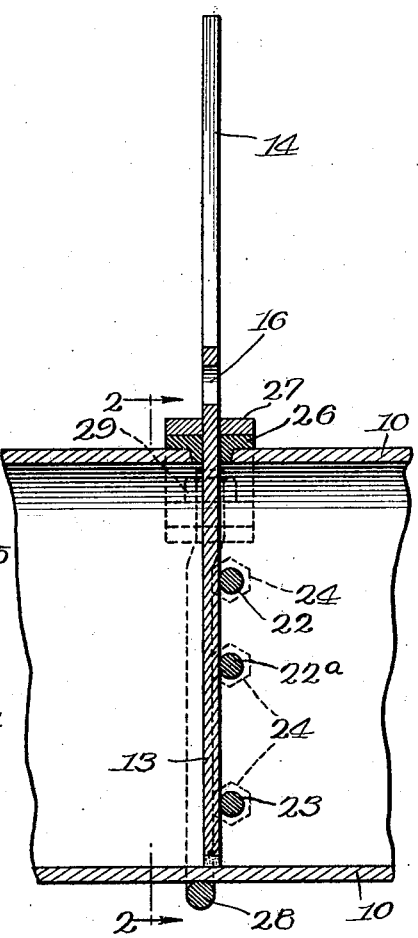
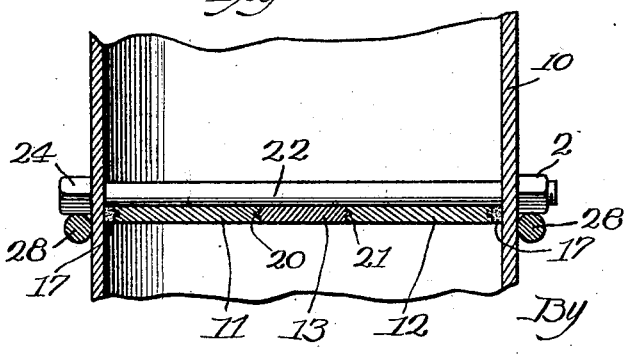
Inventor:
Howard L. Gentry Patented Mar. 19, 1929.

1,705,666

UNITED STATES PATENT OFFICE.

HOWARD L. GENTRY, OF LOUISVILLE, KENTUCKY.

STOPPER.

Application filed September 7, 1926. Serial No. 133,832.

The present invention relates in general to a valve, and more in particular to a valve-like instrumentality herein termed a stopper, by means of which a flow of substance through a pipe line may be arrested without the necessity of actually severing the pipe itself. The invention also includes a method for stopping the flow of materials in pipe lines, the method being preferably practiced by means of the stopper herein described.

It is frequently necessary or desirable to stop the flow of liquid or gaseous substances in a pipe line in a region where there is no regularly provided valve. Such instances may arise where it is necessary to make minor adjustments or repairs, or where leaks develop which must be cared for, and in a number of other instances which will readily present themselves to the mind of a person interested in this line of endeavor.

One of the principal objects of the present invention is to provide means whereby the flow of substance through a pipe may be arrested at any selected point.

Another object of the invention is to provide means whereby the flow of a substance through a pipe may be prevented with a minimum loss of such substance flowing through said pipe.

A further object is to provide a method whereby the flow of a substance through a pipe may be arrested at a given point without the necessity of preliminarily shutting off the flow of such substance by the operation of a regularly provided valve.

Another object of the invention is the provision of a novel instrumentality adapted to be inserted into a pipe for the purpose of providing a closure for the pipe to prevent the flow of material therethrough.

A further object of the invention is the provision of a novel closure member having unique structural features comprising sectors and a wedge-like part adapted to stop a pipe by insertion thereinto, the wedge-like member co-operating with the sectors to provide a transverse barrier in such pipe.

In accomplishing the objects of the invention a narrow transverse slot is cut in the top of the pipe, at the place where the flow is to be arrested, and two flat sectors of discs (provided for the purpose) are inserted through the slot in the top of the pipe. A wedge-like section of material designed to co-operate with the two sectors is then extended through the slot and forced down along the edges of the two sectors, thereby forcing the two sectors against the interior surface of the pipe. Transverse stay bolts are extended through the pipe and prevent the force of the substance flowing through the pipe from dislodging the three pieces inserted through the slot. Any conventional means, such as a gasket, is then employed to minimize the leakage through the transverse slot.

Other objects and features of the invention will become apparent from a consideration of the following detailed description, taken with the accompanying drawing, wherein Figure 1 is a longitudinal sectional view through a pipe line in which a stopper or stop member embodying the main features of the present invention is in use;

Figure 2 is a sectional view taken on the line 2—2 of Figure 1 looking in the direction of the arrows and showing the stopper itself in full view, a portion thereof, however, being broken away for purposes of illustration; and Figure 3 is a plan sectional view taken on the line 3—3 of Figure 2.

The method of providing a closure will be fully understood by reference to the equipment here described and with which it may be practiced.

Referring now to the accompanying drawing wherein like reference characters are employed to designate similar members throughout the several views, the invention is shown applied to the usual form of large iron pipe 10. The stopper itself comprises disc sectors 11 and 12 and a wedge section 13 intermediate the two sectors 11 and 12.

The sectors 11 and 12 have upper extension portions designated 14 and 15 respectively, whereby said sectors may be conveniently handled when placed in a pipe line in which a somewhat high pressure is maintained, or in which the normal rate of flow of a substance therethrough is quite rapid. In the upper portion of the wedge-shaped member 13 is an aperture 16 whereby withdrawal of said wedge member is facilitated.

The outside portion of the sectors 11 and 12 is provided with a packing of any suitable substance, such as lead 17, in which case it is preferable to form a groove in the periphery of the sectors 11 and 12 whereby a tongue and groove effect between the lead packing and the sectors may be obtained. Preferably, the bottom portion of the wedge 13 is also provided with packing 18.

The inner straight edges of the sectors 11 and 12 are provided with grooves as shown in Figure 3 whereby continuous groove-like projections 20 and 21 on the wedge 13 may produce a close association between the members.

To facilitate retention of the gas stopper proper within the pipe line, a plurality of stay bolts 22, 22$^a$ and 23 may be arranged transversely of the pipe 10 and abut the sectors 11 and 12 and the wedge section 13 in the manner shown in Figure 3. The stay bolts 22, 22$^a$ and 23 are secured in properly provided apertures in the side of the pipe 10 by means of ordinary nuts 24, and since said stay bolts 22 and 23 may be secured in a position away from the center of the pipe 10, nut leveling members 25 may be provided in the manner shown. These members 25 permit a close engagement of the associated nuts 24 whereby the stay bolts 22 and 23 may be secured tightly in place.

In order to prevent too great loss of the substance flowing in the pipe through the slot therein, a gasket 26 of rubber or other suitable material is provided, said gasket being maintained in place by gasket clamp 27, held in firm engagement thereagainst by means of a U-shaped bolt 28 and nuts 29. The U-shaped bolt 28 is slightly offset to permit location of the nuts 24 whereby stay bolts 22, 22$^a$ and 23 may be secured in close engagement with the sectors 11 and 12 and the wedge member 13. Other suitable means may be provided, however, to obtain this same result.

The particular disclosure of the invention in the drawing may be departed from considerably, while the same general subject matter is maintained. When using extension members 14 and 15 it is more or less obvious that the gasket 26 and gasket clamp 27 must be put in position preliminary to the insertion of the sectors 11 and 12 and the wedge member 13.

It is also contemplated that the extensions 14 and 15 can be formed separately from the sectors and secured thereon by means of long machine bolts or in any other suitable way. In this case the sectors may be placed in position and secured by driving the wedge member into place, after which the extension portions 14 and 15 on the upper part of the wedge member could be removed, thereby permitting a gasket to be fitted into the slot in the pipe and entirely sealing the same.

The usual operation of the device as disclosed will be described. The first step preliminary to use is to drill a plurality of holes in the side of the pipe in the region in which the stoppage is to be made. The stay bolts 22, 22$^a$ and 23 are then secured laterally across the pipe. Then immediately above the bolts 22, 22$^a$ and 23, but slightly in a direction against the flow of the substance in the pipe, a narrow slot equivalent in length to about one-sixth the circumference of the pipe 10 is cut.

The gasket 26 is then placed in position over the slot and the gasket clamp 27 and U-shaped bolt 28 secured loosely in position. The sector 11 is then grasped by the extension portion 14 and inserted through the slots in the clamp 27 and the gasket 26, and inserted into position in the pipe 10.

The sector 12 is then similarly placed in position by grasping it by the extension portion 15. Next the wedge portion 13 is forced down between the two sectors 11 and 12 by driving or otherwise. This causes a spreading of the three members named so that they closely engage the pipe 10 around its entire interior. The size of the sectors 11 and 12, and wedge member 13 being determined by the size of the pipe in which they are to be used, an accurate fit and a complete shutting off of the pipe can obviously be obtained.

The nuts 29 are then tightened, causing a flattening of the gasket 26 which will result in a filling of the interstices around the opening in the pipe, diminishing the flow of gases or other substance therethrough. By proper application, a stopper made as shown in the drawing can be used to obtain a complete closure in a pipe line. Such a close fit may be obtained that a complete stoppage of the flow of a substance through the pipe and avoidance of all leaking therefrom may be effected.

The pipe stopper herein described can be employed to check the flow of any kind of substances either in liquid or in a gaseous form, or in fact, to halt the flow of any kind substances which are conveyed through pipes.

The particular embodiment shown in the drawing is designed to stop the flow of substances which are flowing at a high rate of speed or under high pressure. Whenever the character of the substance or the pressure, or rate of flow thereof varies, specific details of the structure may be modified slightly to meet particular requirements. The invention therefore is not to be limited except in so far as defined by the appended claims.

Having thus described my invention, what I claim is new and I desire to procure by Letters Patent of the United States is:

1. A pipe stopper designed to be inserted through an opening provided in a pipe, said pipe stopper including preformed rigid segments designed to grip the interior surface of the pipe and having handle portions adapted to extend outwardly of said opening, and means for causing a separation of said segments to increase the closeness of association between the segments and the interior surface of the pipe.

2. A pipe stopper designed to be inserted through an opening provided in a pipe, said pipe stopper including a pair of preformed rigid segments designed to be inserted through said opening and having handle portions extending outwardly thereof, and a wedge-shaped member designed to be inserted between said segments to force said segments apart, and having means for aligning said segments therewith, the segments having a periphery corresponding to the internal wall of the pipe.

3. A pipe stopper as described in claim 2, and wherein the outer edge of said segments is faced with a deformable material.

4. A pipe closure comprising three members, two of said members having deformable edges of substantially the configuration of the interior of the pipe in which used, and the third a deformable end and edges cooperating with the other members to hold said members in alignment and provide a wedge therebetween, the two members first mentioned having extension portions providing handles to hold said members preliminary to inserting said latter mentioned member therebetween.

5. A pipe closure as described in claim 4, and having in association therewith means disposed transversely of said pipe in advance of said closure members and forming a support about which the material in said pipe may readily flow but facilitating the positioning of said closure members.

HOWARD L. GENTRY.